(12) United States Patent
Serra

(10) Patent No.: US 8,794,822 B2
(45) Date of Patent: Aug. 5, 2014

(54) LID, PARTICULARLY HAVING A BEVERAGE CUP

(75) Inventor: Gabriel Serra, Berlin (DE)

(73) Assignee: Tossy Coffee Cup Lid Ug & Co. KG, Dachau (DE)

( * ) Notice: Subject to any disclaimer, the term of this patent is extended or adjusted under 35 U.S.C. 154(b) by 1198 days.

(21) Appl. No.: 12/675,391

(22) PCT Filed: Aug. 27, 2008

(86) PCT No.: PCT/EP2008/061209
§ 371 (c)(1),
(2), (4) Date: Feb. 25, 2010

(87) PCT Pub. No.: WO2009/027426
PCT Pub. Date: Mar. 5, 2009

(65) Prior Publication Data
US 2010/0308046 A1    Dec. 9, 2010

(30) Foreign Application Priority Data
Aug. 29, 2007  (DE) .......................... 10 2007 040 996

(51) Int. Cl.
*B01F 7/16* (2006.01)
*B01F 15/00* (2006.01)

(52) U.S. Cl.
CPC ............ *B01F 15/00792* (2013.01); *B01F 7/16* (2013.01)
USPC ............................ 366/347; 366/130; 366/244

(58) Field of Classification Search
CPC ...................... B65D 2543/00046; B65D 47/06; B01F 13/002; B01F 15/00506; B01F 7/00116; B01F 7/00141; B01F 7/003; B01F 7/169
USPC ................................... 366/244, 130, 129, 347
See application file for complete search history.

(56) References Cited

U.S. PATENT DOCUMENTS

| | | | | |
|---|---|---|---|---|
| 214,617 | A | * | 4/1879 | Brown .............................. 239/33 |
| 1,193,954 | A | * | 8/1916 | Walden .......................... 366/343 |
| 1,309,994 | A | * | 7/1919 | McAuliffe .................... 215/11.1 |
| 1,344,836 | A | * | 6/1920 | Walden .......................... 366/130 |
| 1,353,443 | A | * | 9/1920 | Wilson .......................... 366/130 |
| 1,707,968 | A | * | 4/1929 | Kieselbach et al. ........... 366/333 |
| 2,025,378 | A | * | 12/1935 | Croasdale, Jr. ................ 366/247 |
| 2,485,303 | A | * | 10/1949 | Marcus .......................... 366/247 |

(Continued)

FOREIGN PATENT DOCUMENTS

| | | |
|---|---|---|
| DE | 10011726 A | 7/1999 |
| DE | 20307684 U | 5/2002 |

(Continued)

OTHER PUBLICATIONS

International Search Report dated Mar. 12, 2009 in corresponding international patent application No. PCT/EP2008/061209, 4 pages.

*Primary Examiner* — Tony G Soohoo
(74) *Attorney, Agent, or Firm* — Maier & Maier, PLLC

(57) ABSTRACT

The invention relates to a lid, particularly having a beverage cup. The lid of a beverage cup, particularly for a single use as a beverage cup, has at least one stirrer. The lid includes a main lid part, a rotary disk, and a rotor. The rotary disk and the stirrer are integrally formed in the assembled state. The main lid part is present between the rotary disk and the stirrer, preferably in a parallel alignment.

17 Claims, 8 Drawing Sheets

(56) References Cited

U.S. PATENT DOCUMENTS

| | | | |
|---|---|---|---|
| 2,613,107 A * | 10/1952 | Hartnett | 239/33 |
| 2,979,267 A * | 4/1961 | Miller | 239/33 |
| 3,295,836 A * | 1/1967 | Langella | 366/248 |
| 3,311,941 A * | 4/1967 | Baker et al. | 401/4 |
| 3,685,803 A * | 8/1972 | Proctor et al. | 366/130 |
| 3,704,007 A * | 11/1972 | Kroeger | 366/248 |
| 3,894,723 A * | 7/1975 | Sanders et al. | 366/248 |
| 4,422,770 A * | 12/1983 | Geible | 366/248 |
| 4,460,279 A * | 7/1984 | Krasney | 366/247 |
| 4,893,940 A | 1/1990 | Waisberg | |
| 4,916,672 A * | 4/1990 | McCrory | 366/130 |
| 4,946,286 A * | 8/1990 | Purkapile | 366/247 |
| 5,076,425 A * | 12/1991 | Plone | 206/220 |
| 5,143,248 A * | 9/1992 | Sawatsky | 220/711 |
| 5,407,270 A * | 4/1995 | Barile et al. | 366/247 |
| 5,673,789 A * | 10/1997 | Degraff-Eugene | 206/217 |
| 5,894,952 A * | 4/1999 | Mendenhall et al. | 220/713 |
| 6,375,092 B1 * | 4/2002 | Banach | 239/33 |
| 6,935,767 B2 * | 8/2005 | Nikkhah | 366/129 |
| D532,242 S * | 11/2006 | Aikens | D7/300.2 |
| 7,275,653 B2 * | 10/2007 | Tedford, Jr. | 220/254.9 |
| 7,731,101 B2 * | 6/2010 | Fabrizio et al. | 239/33 |
| D631,348 S * | 1/2011 | Weiss et al. | D9/447 |
| D638,243 S * | 5/2011 | Carlson et al. | D7/300.2 |
| D648,985 S * | 11/2011 | Chiu et al. | D7/510 |
| 8,092,072 B2 * | 1/2012 | Parias Cruz | 366/129 |
| 8,172,452 B2 * | 5/2012 | Bacon et al. | 366/130 |
| 2001/0036124 A1 | 11/2001 | Rubenstein | |
| 2004/0076074 A1 * | 4/2004 | Shubeck | 366/129 |
| 2007/0056447 A1 | 3/2007 | Swartz et al. | |
| 2008/0128529 A1 * | 6/2008 | Fernandez | 239/33 |
| 2008/0259718 A1 * | 10/2008 | Agardici et al. | 366/129 |
| 2009/0147615 A1 * | 6/2009 | Parias Cruz | 366/130 |
| 2010/0065566 A1 * | 3/2010 | Bacon et al. | 220/212 |
| 2010/0308046 A1 * | 12/2010 | Serra | 220/212 |

FOREIGN PATENT DOCUMENTS

| | | |
|---|---|---|
| JP | 2001-120414 A | 5/2001 |
| JP | 2004-073345 A | 3/2004 |
| WO | 2007/012679 A | 2/2007 |

* cited by examiner

LID, PARTICULARLY HAVING A BEVERAGE CUP

RELATED APPLICATIONS

This application claims priority, under 35 U.S.C. §119, to international patent application No.: PCT/EP2008/061209, filed on Aug. 27, 2008, which claims priority to German patent application No.: 10 2007 040 996.8, filed Aug. 29, 2007, the disclosures of which are incorporated by reference herein in its entirety.

The instant invention relates to a lid of a beverage cup, in particular of a warm beverage cup. Warm beverage cups are those cups, which are often offered as single-use cups to passers-by and to road users by beverage and restaurant carts and which are filled with warm and hot beverages, such as coffee, tea or a chocolate drink. It is thereby largely common for the consumer to additionally change the taste of the beverage in the warm beverage cup by adding sugar, milk or flavor essences, for example. The substance, which is additionally added into the warm beverage, is dissolved in the warm liquid of the warm beverage using a stirrer, for example a spoon. The instant invention relates to a suitable lid and to a corresponding method.

STATE OF THE ART

Over the last decades, it has become increasingly common in many countries to shift the drinking of warm beverages to the time during which the consumer is in motion, for example during a shopping spree. For this reason, many food and beverage carts as well as fast food restaurants offer beverages in covered cups. It is widespread for the consumer to lift the lid once more when purchasing the warm beverage, so as to add additional flavor-changing substances, such as sugar or sweetener, to the beverage. Due to the fact that sugar or sweetener only dissolves well by means of stirring, the vendors of warm beverages often additionally hand out a stirrer simultaneously with the warm beverage. In the event that the consumer is located in a vehicle, the separately offered stirrer is left over after the use; the consumer must dispose of the stirrer.

The two Japanese Patent Applications JP-A-2001 120 414 and JP-A-2004 073 345 show coffee spoon solutions, which can be inserted into the lid and which, due to its shape and arrangement, automatically store the coffee spoon after its use on the inside of the cup between lid and inner wall of the cup in a space-saving manner. Due to the spoon insertion position, the solutions presented in these applications, however, only provide for one pivoting possibility for the spoon, but not a rotating stirring motion. However, it is commonly known that stirring motions cause the additive in the warm beverage to dissolve much quicker. Based on this knowledge, German Patent Application DE 100 11 726 A1, U.S. Pat. No. 4,460,279 and U.S. Patent Application 2001 00 36 124 A1 propose stirring systems, which can initiate stirring motions of larger quantities of liquids. However, due to their complicated designs, the proposed solutions miss the cost targets of fast food chains to a considerable extent. In further developing the crank mechanism from DE 100 11 726 A1, WO 2007/012 679 A1 proposes a solution, which can be realized by means of disposable cups and with a small effort. The patent application discloses a C-shaped spoon, which can additionally be inserted through a slit in the center of the lid. The C-shaped spoon is provided with a crank at one end, so that the consumer can initiate a rotation of the spoon, which is fastened to the crank on the inside of the cup, at the crank, which protrudes out of the lid. Such a miniaturized design cannot be operated optimally with large, awkward or clumsy fingers, respectively. The separate lifting of the lid for adding additives is also disadvantageous. The beverage connection is designed in a straw-like manner. Many consumers perceive the drinking of hot beverages from a straw to be unpleasant, because the hot beverage hits the oral cavity selectively and can cause burns there. The crank can be bent easily, so that the spoon, which can be assembled, falls apart easily at the location where it is inserted into the lid and the part of the spoon located on the inside falls to the bottom of the cup. The assembly of a corresponding beverage cup comprising a lid is also laborious. The lid must be attached; the spoon must additionally be inserted through the slit in the lid. In particular in the case of full cups, small fountains can squirt upwards out of the slit. The risk of spilling the warm beverage is not completely averted.

US 2007 056 447 A1 describes a cup comprising a stirring device, wherein a cup body, which is open towards the top, can be closed by means of a lid. An arm extends from the bottom side of the lid into the body of the cup. A control lever extends from the upper side of the lid outwardly through the second one of the openings. The control lever is connected to the arm, so as to be capable of moving the arm relative to the body of the cup. A disadvantage of the cup of US 2007 056 447 A1 is to be seen in that the designs of the lid, of the stirring device and of the closure of the lid comprising the cup are designed to be very extensive, because they consist of many interlocking components, which are formed in a complicated manner. One compartment is intended to operate as a reusable part. The cup is thus designed for a repeated use, which is deemed to be unacceptably unhygienic and inefficient in the fast food industry, for example, because it increases costs. From the radius of engagement, the operation of the control lever for the stirring device, which is designed as a turning handle, is furthermore rather difficult and laborious for the fingers of the user and the rotation thereof seems to be rather sluggish due to the inevitable friction of the many parts and friction surfaces.

A stirring device and a beverage mug using this stirrer device are described in U.S. Pat. No. 4,893,940 A. The stirring device is fixed in the beverage mug for stirring or moving, respectively, the content of the mug. The beverage mug from U.S. Pat. No. 4,893,940 A is designed as a bar container for larger quantities of beverages, which are sufficient to refresh more than one person. The stirrer must thus be designed to rotate the large quantities of beverages, in particular to be supported in a correspondingly extensive manner. This becomes clear, for example, in that in addition to the storage in the lid of the mug, the stirrer is also supported by a bearing surface at the bottom of the mug. With reference to the dual support, the same also applies to the above-mentioned cup of US 2007 056 447 A1.

A mug comprising a stirring device and a lid, which can be fixedly connected to the upper side of the mug, can be gathered from U.S. Pat. No. 5,407,270 A. The lid comprises-a rotatable disk, which sits in a recess of the lid and which can be rotated by means of an eccentric turning knob. The stirring device comprises a piston and is centrally connected to the disk via an opening in the lid in such a manner that the disk and the piston rotate relative to the mug in response to the rotation of the turning knob. The piston is equipped with four blades, which are arranged in an equiangular manner and which stir the liquid. The dual support of the stirrer of U.S. Pat. No. 5,407,270 A is similarly extensive as in the bar mug described in the above-mentioned U.S. Pat. No. 5,407,270 A.

DE 203 07 684 U1 describes a bottle for sludgy spices, condiments, etc., which can be stirred and which consists of a bottle body comprising a pouring spout, a cap, which can be stuffed into the upper end of the bottle body, thus closing the bottle body, and a stirrer comprising a mixing rotor and a rotary disk, which is held at the upper side of the cap so as to be capable of being rotated and which comprises a crank handle, wherein the mixing rotor at the upper end of its shaft is made to rotate via a coupling by means of the rotary disk. At its upper end, the shaft is in an operational connection with the rotary cap by means of a detachable positive coupling and is held at its lower end in a bearing, which is centrally arranged at the bottom of the bottle body, so as to be capable of being rotated. When stuffed in, the lower edge of the cap is located lower than the pouring spout. Even in the case of the bottle from DE 203 07 684 U1, which can be stirred, it is necessary to provide for an extensive dual support of the stirrer, due to the increased viscosity of the sludge, which is to be stirred.

DESCRIPTION OF THE INVENTION

The inventor of the instant invention thus searched for a possibility to be capable of placing a lid onto a beverage cup, in the case of which he can further reduce the risk of spilling and in the case of which the lid is at the same time widely accepted by the vendors of warm beverages as well as by the consumers of warm beverages thanks to its excellent handling.

The object according to the invention is solved by means of a lid for a beverage container, such as a cup, according to the main claim. An advantageous, efficient assembly method for the use of a corresponding lid is proposed in claim 19. Advantageous developments can be found in the dependent claims.

It is up to the user of the beverage cup, which intended liquid intake the beverage cup comes to experience, so that the instant invention can also be used for beverage cups, which can be filled with cold beverages. Sugar, milk, sweeter or another additive is preferably dissolved in a warm beverage, such as coffee, because the solubility is considerably higher as compared to corresponding cold beverages. Beverage cups for walking customers are designed in such a manner, that the beverage cups are single-use cups. At least one stirrer is located on the lid. The lid comprises a plurality of parts. The lid is divided. The lid comprises a main lid part. A rotary disk spreads out parallel to the main lid part, in the same direction as the main lid part extends in a rotatory manner. When the lid is assembled with the stirrer, the stirrer is fixed to the rotary disk. The stirrer projects out of the lid on the one side. The rotary disk is located on the other side. The main lid part extends between both parts. In a view from the side, main lid part as center part and rotary disk and the rotor, aligned parallel thereto, look like a layer construction. When the lid is assembled, all parts are fixedly connected to one another. Seen from the upper side, the consumer initially looks onto the rotary disk, underneath which the main lid part extends. The rotor comprising its stirrer is present on the underside of the main lid part. A part of the rotor is located parallel to the main lid part and to the rotary disk.

The main lid part has a through hole. A part of the rotor can be inserted through the through hole. In an alternative embodiment, a part of the rotary disk can be inserted through the main lid part. Both parts can try to find support in the insertion location of the main lid part. The main lid part thus closes essential areas of the cup. At the same time, the main lid part serves as a bearing for the rotary disk. The main lid part also serves as a bearing for the rotor. At the same time, the rotation point, about which the rotor can rotate, is the bearing of the rotor. The rotor deflects the stirrer, which is part of the rotor, from the rotation point. The stirrer engages with an end of the rotor. Small rotations of the bearing of the rotor thus ensure a comparatively large rotation of the stirrer of the rotor.

A highly compact integrally formed lid can be produced by means of die casting due to the parallel alignment of the main lid part comprising the rotary disk and a substantial part of the rotor on the one side and due to the advantageous support of the rotor on the main lid part on the other side. The lid can be stored in a space-saving manner; the stirring device claims only very small volumes in axial cup direction within the cup. The lid is flat.

The one end of the rotor is located in the bearing of the rotor. The other end of the rotor, which as a whole is an elongate part and which is bent several times, forms from the stirrer. In one embodiment, the stirrer can be an elongate, insertable round connector, which is to be inserted into a lengthwise truss of the rotor in a positive fit. The bearing end of the rotor points axially in the one direction, while the stirrer at the other end of the rotor points in the opposite direction. The bearing part supports in the center of the main lid part. The rotor has approximately the same length as the radius of the main lid part or as the design of the radius of the rotary disk, respectively. Due to this design, the three individual component parts of the lid, main lid part, rotary disk and rotor, as a whole, are very flat.

The main lid part has a completely revolving rotating flaring, in the center of which the lid encompasses an inner lid depression. The inner lid depression serves to accommodate the rotary disk. The drinking spout is removed from a mouthpiece, which is integrally molded at the edge. The rotating flaring passes into the mouthpiece. When drinking, the rotary disk does not interfere, because it lies flat underneath the edge of the lid.

Provision is made in the rotary disk for a finger ring. The finger ring is large enough for a typical index finger or middle finger to engage at that location with the fingertip. The rotary disk can be made to rotate by means of rotary motions with the corresponding finger and the rotor connected to the rotary disk rotates with it at the same speed. The arrangement of the finger ring in the outer area of the rotary disk is beneficial to the handling, so that the rotary motion, which is to be carried out, encompasses a larger radius, which substantially corresponds to the pivoting radius of the wrist.

Provision is furthermore made in the lid for a filling spout. The filling spout is comprised of two individual filling spouts, so-called partial filling spouts, which are located in the main lid part and in the rotary disk. Due to the fact that the rotary disk and the main lid part can be rotated relative to one another, the filling spout can be opened; this is the filling position. The filling spout can be closed by turning the rotary disk to the main lid part; this is the drinking position. In the drinking position, the rotary disk retains the drinking liquid in the event that the warm beverage cup tips over. Ideally, filling position and drinking position are to be assumed in each case by means of turning the rotary disk by 180°. Large turning angles ensure a simplified handling.

A clamping edge follows the rotating flaring. The clamping edge is designed in such a manner that the lid can be attached to the edge of the warm beverage cup and so that it can engage into a positive connection. The clamping edge has its own height. The height of the slat of the rotor is smaller than the height of the clamping edge. Due to this design, the slat itself is not located in the beverage liquid, on the one hand, which is considered to be more hygienic, and it promotes the stackability, on the other hand, which will be explained later.

Main lid part, rotary disk and rotor can be plastic parts. All parts are flat parts. Flat parts can be produced reliably using a small amount of closing force in injection molding machines of low quality. A rotor rivet is integrally molded at one end of the rotor. In the event that the rotor rivet is introduced into the bearing of the main lid part, a single degree of freedom, namely the rotating degree of motion remains for the motor. Rotor, main lid part and rotary disk are brought into a permanent interconnection by pushing down the rivet; they can no longer fall apart.

A lid according to the invention reliably ensures retention of the liquid, even in the case of agitations. At the same time, the operation of said lid is easy. The lid must not be removed again, even when any additives, such as sugar, are to be additionally poured into the beverage.

Segmented objects, which must no longer completely span the inner lid depression, but which offer a sufficient surface, so that the stirrer can easily be made to carry out rotary motions with the use of only one finger, are considered to be a rotary disk as well.

To store them, the individual lids can be stored easily in a stacked manner in their unassembled state and in their not yet completely assembled state. In a restaurant, the lids must be delivered in two parts. The first part comprises the main lid part, the rotary disk and the slat of the rotor, which is fixed to the main lid part. A second part, for example a hygienically separated and separately packaged part, can be the stirrer. The stirrer must be inserted into the slat in a positive fit. For this purpose, the slat provides for a stirrer opening. Once the stirrer is inserted into the slat, the lid can be attached to the cup. For this, the lid provides for a clamping edge. The clamping edge is slightly larger than the upper opening of the cup, which runs at right angles.

Due to the ability to stack the first part of the lid, many first parts of the lid can be stored in a space-saving manner so as to be stacked on top of one another, for example in a lid dispenser. For this purpose, a plurality of first parts of the lid can be stacked on top of one another and can subsequently be removed or separated easily, respectively.

Rotary disk and stirrer can be assembled. The main lid part forms a bearing. The bearing is the central rotation point, to which the rotary motion refers. The rotary motion is designed so as to circle around the central point. The rotation can proceed around the bearing point. The bearing is used by a connection, which can be inserted. The rotary motion circles around a central point. The rotary motion of the stirrer runs at an even distance to the wall of the single-use cup. The lid is designed in such a manner that the rotor, pointing away from the lid, points towards the bottom of a single-use cup, which is to be connected.

Main lid part, rotary disk and the object, which can be used as stirrer, are three parts, which must be arranged at least partially parallel in the assembled state. The rotary disk is located within an outer flaring of the main lid part, so as to be recessed. The main lid part has a revolving edge, which is higher than the height of the rotary disk, which is to be placed into the main lid part. The rotary disk offers areas, which can be used as guide means. Such a guide means can be the connection for a drinking straw. Such a guide means can be an engagement for a finger ring. Such a guide means can be a clamp fastening.

The lid is designed so as to consist of two layers. The two-layer design of the lid ensures rotatability. The stirrer can be fixed into one of the two parts, which can be rotated relative to one another. The main lid part is the supporting part, to which the further parts of the single-use cup can be fixed.

In a preferred embodiment of the lid, the stirrer encompasses at least one stirring element, which is at least partially two-dimensional, in particular a sail-shaped stirring element. The stirring element is mounted to a mounting frame, which at least partially envelopes the stirring element. The stirring element can be designed in a single layer by means of one layer. The stirring element can at least partially also be designed in multiple layers by means of more than one layer. In the case of a multi-layer design of the stirring element, the layers are connected to one another, for example by means of adhesion, at least partially in a two-dimensional manner, in particular at their edges. The stiffness of the stirring element supports the achievement of a stirring effect, which can be predetermined. The mounting frame can form the lower part of the rotor. The mounting frame provides for the mounting of the two-dimensional stirring element in at least one direction of extension, preferably in two different directions of extension. The mounting frame, however, can also mount the stirring element in three different directions of extension.

The stirring element can be a folded straw. The straw is to be placed into a fixing means, e.g. two fixing clamps, which are mirrored against one another, or clamp-like depressions. The straw can be folded down in such a manner that one end of the straw can be located in the fixing means. So as to feed the straw into a drinking position, the straw can be folded upward. The straw is fixed to a rotatable part of the lid. The straw takes over the rotary motions of the lid and transfers them to its end with stirring effect. In one position, the straw is a drinking straw. In one position, the straw is a stirring element. Objects made from straw, plastic or other objects, such as straw-like, elongate objects in terms of the instant invention, are referred to as a straw. The lid provides for a clamping fixing device for one end of the drinking straw. A few percent of the entire length of the drinking straw project across the fixing device in the direction towards the outer edge of the lid. The drinking straw is a drinking straw, which is bent several times and which can be folded towards its direction of rotation. In the stirring position, the drinking straw is bent at least like a simple C. In its drinking position, at least one end area of the C-shaped drinking straw is bent over. In one embodiment, the rotor is an elongate object, which is rotationally symmetrical in sections, the diameter of which is narrow and the dimensions of which are longer than wide to a considerable extent. Fixing means and finger ring can be the same bulge in the lid. The individual parts of the lid, which are discoidal, can be held together by means of the drinking straw. For this purpose, the drinking straw has an accordion-like section, in the sections of which, which bulge inwardly, one part of the lid is supported in each case.

The mounting frame, for example, can be formed by a piston element, such as a small tube, which in particular forms the lower part of the rotor of the stirrer. As a further example, the mounting frame can be a part of the rotor, which is a particularly simple, angled, just as well plane, mainly lower part. The stirring element can encompass a sail-like triangular shape, for example. The mounting frame, however, could also mount the stirring element three-dimensionally, for example like an axially protracted propelling screw. At the same time, the small tube can be used as a drinking straw.

Advantageously, the stirring element can be designed as a container being at least partially suitable for food and being capable of being penetrated by the content of the cup, in particular being capable of being dissolved in the content of the cup, for at least one additive, which is quantitatively preassembled therein. The container can release the at least one additive into the content of the cup. The additive can be sugar or a spice or medication, for example. The stirring element can be designed, for example, as a sack element preferably being at least partially suitable for food and being capable of being dissolved in the content of the cup, which, in response to its partial dissolving, releases at least one additive, such as sugar or a spice or medication, which is to be stirred, into the beverage content of the cup. The partial penetration or dissolving, respectively, and thus the proper opening of the container or sack content, respectively, can take place by means of the heat of the beverage filled into the cup, for example. The dissolving could also take place by means of a certain ph-value of the content of the cup. The penetration or dissolving, respectively, can take place immediately upon dipping the stirring element comprising the container into the content of the cup or in a time-delayed manner.

The stirring element can be designed in two layers or in a plurality of layers. Preferably, the stirring element is designed in two layers, thus by means of two layers. Preferably, the layers are connected tightly at their edges for the additive. The container is designed for the, in particular intermediate storage of at least one, preferably quantitatively preassembled additive by means of, in particular, between the layers comprising at least one compartment.

Advantageously, the stirring element can encompass at least two compartments, which are in particular separated from one another, in each case for at least one additive. The compartments can provide for the release of the additives into the content of the cup in time output rates, which can be predetermined, in particular in a time-delayed manner, e.g. at a different release speed, by means of a rate regulating device, such as different membrane thicknesses or different mesh sizes of the layers.

Due to the time-delayed embodiment of the penetration or dissolving, respectively, for example means of different membrane thicknesses of the stirring element layers, the release of the additives into the content of the cup can also take place either in time intervals, which can be predetermined, or in output rates, which can be predetermined, or both. This is advantageous, for example, in particular when the at least one additive is a medically active substance, such as medication, such as aspirin. This can be advantageous even when the additives in the content of the cup encompass different solubilities. Despite different solubilities of the additives, the rate regulating device can be used to release the proportions of the additives, which react differently in particular with one another and with the content of the cup in a physical, chemical, pharmaceutical, etc. manner and which are to be dissolved in the content of the cup, into the content of the cup at an output rate, which can be controlled and predetermined.

The stirring element can encompass at least one swirl-inducing, in particular swirl-amplifying design element, such as a flow passage or swirling means, respectively, such as a flow opening. The flow openings of the stirring element could be closed in response to the production of the stirring element by means of containers, which can be penetrated by the content of the cup or which can be dissolved by the content of the cup, respectively, such as sacks, which can be dissolved in the content of the cup. The additive containers can be quantitatively preassembled with the additive.

In response to the appropriate use of the stirring element, the content of the cup penetrates the additive container or the additive container dissolves in the content of the cup, respectively, and releases the respective additive. By penetrating or dissolving the additive container, respectively, that is, in response to the activation of the rate regulating device, the swirl-inducing design element, such as the flow opening, is brought into the adequate, that is, swirl-supporting or swirl-inducing state, respectively. In so doing, the additive can advantageously be brought into the content of the cup in an efficient manner, can be released and stirred at that location without in each case requiring an extra opening and introduction operation into the content of the cup for the additive and its container.

The rotary disk can also be equipped with a fixing means for fixing the rotor, which is in permanent connection. Preferably, the fixing means is arranged at the upper side of the rotary disk. Due to its axial projection, the fixing means fulfills the function of the finger ring in cooperation with the upper end of the rotor. An axial projection is a sticking out substantially in the longitudinal direction of the cup upwards, wherein the cup is to be envisioned in its position of use.

In the pivot state of the permanent connection of the rotor, the fixing means and the upper end of the rotor allow for the uncomplicated rotatory actuation of the stirrer by means of the consumer. The fixing means is arranged at the upper side of the rotary disk. The fixing means can be designed as two fixing lugs, which project upwardly and which are curved, in particular. The fixing means can also be designed as a fixing ring, as a fixing strap, etc. Preferably, the fixing means is arranged in the outer area of the rotary disk.

DESCRIPTION OF THE FIGURES

It is even easier to understand the instant invention when reference is made to the enclosed figures, wherein.

DETAILED DESCRIPTION

Three embodiments of the invention will be described in more detail below by means of the figures.

Figure 1:
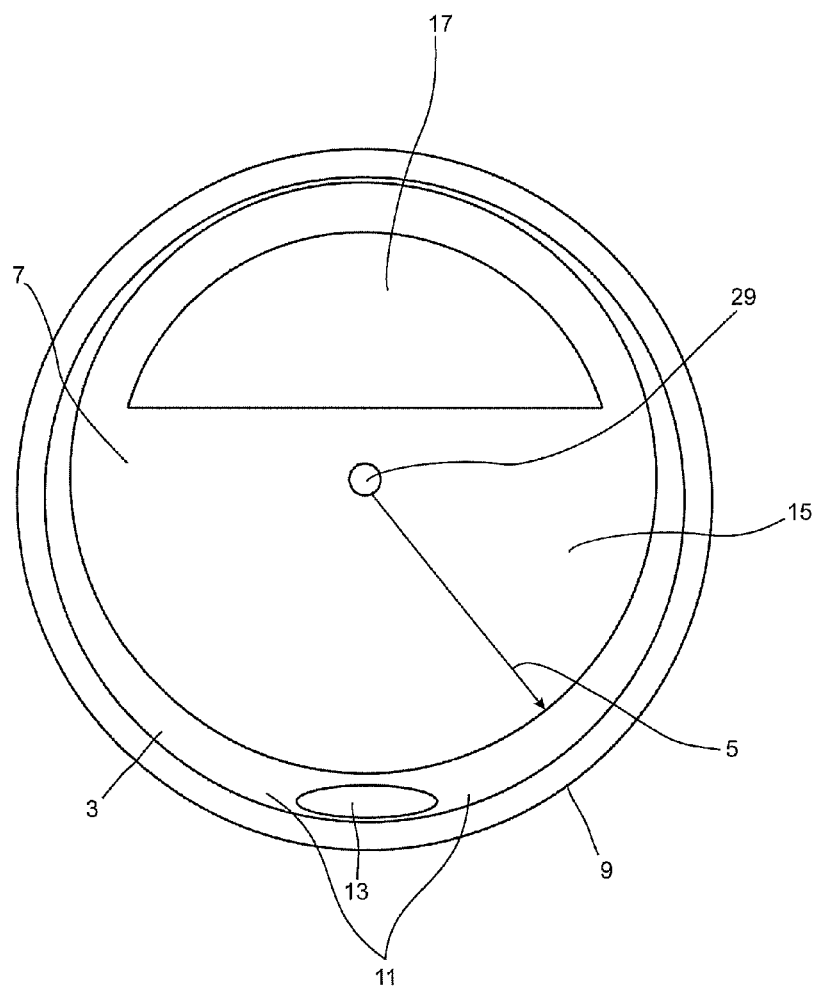
FIG. 1 shows a main lid part according to the invention from the top.

FIG. 1 shows the central part of a lid according to the invention, the main lid part 15. The main lid part 15 is defined by the clamping edge 9, to which the rotating flaring 3 connects towards the center, before the inner lid depression 7 comes up to the bearing 29 as further, largest surface. The inner lid depression 7 encompasses a filling spout 17. A special area, which represents the mouthpiece 11, is molded out of the rotating flaring 3. The mouthpiece 11 is raised upwards. "Upwards" in terms of the invention refers to the direction away from the cup. The drinking spout 13 is located in the mouthpiece 11. The transverse surface 5 of the lid extends from the bearing 29 to the rotating flaring 3 and its purpose is to accommodate the rotary disk 31 (which can be seen in FIG. 2).

Figure 2:
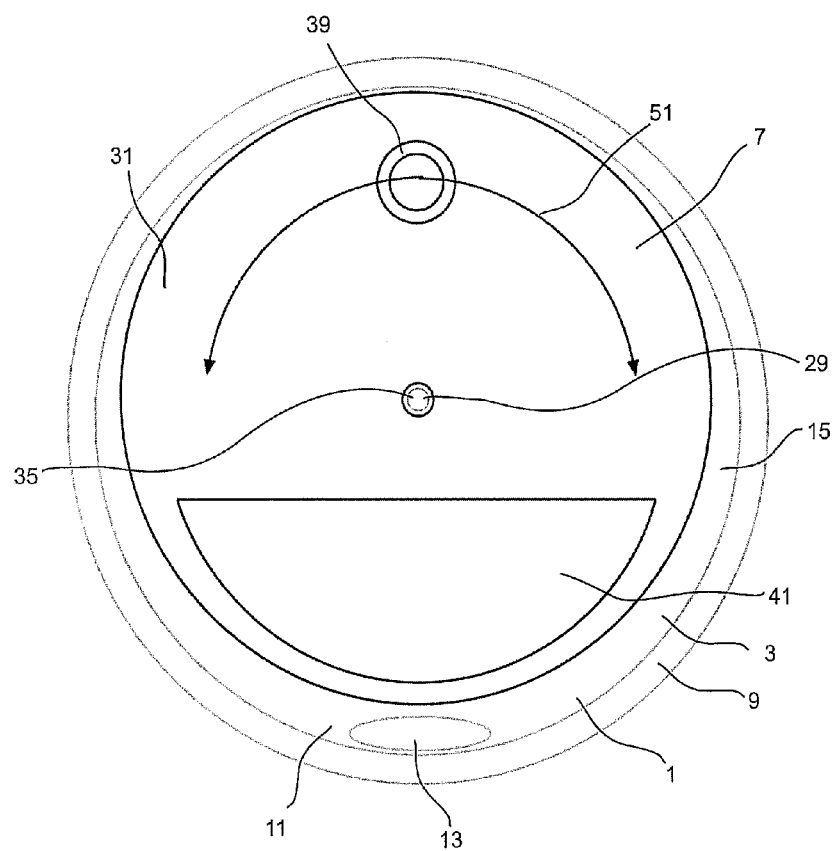
FIG. 2 shows a lid according to the invention from the top.

FIG. 2 shows the rotary disk 31 in connection with the main lid part 15 located therebelow. The main lid part 15 located therebelow is represented less pronounced than the rotary disk 31 located thereabove. Due to the fixed connection via a rotor rivet hole 35, which represents the bearing 29, only one degree of freedom remains for the rotary disk 31, namely the direction of rotation 51. A finger ring 39 is integrally molded in the rotary disk 31. The finger ring 39 encompasses a centering elevation; in the illustrated design, the finger ring is a hole, which passes through the rotary disk 31. The rotary disk 31 is located in the area of the inner lid depression 7 of the main lid part 15. The rotary disk 31 is defined by the rotating flaring 3, from which the mouthpiece 11 comprising its drinking spout 13 is separately molded so as to stand higher. The lid 1 is comprised of a plurality of parts. The clamping edge 9 represents the outermost part of the lid 1. A filling spout 41 is in the rotary disk 31 as well as in the main lid part 15, which is located therebelow. In the position illustrated in FIG. 2, the lid 1 has assumed the drinking position II, because the filling spout 41 ends on the inner lid depression 7—the filling spout 41 is not constant.

Figure 3:
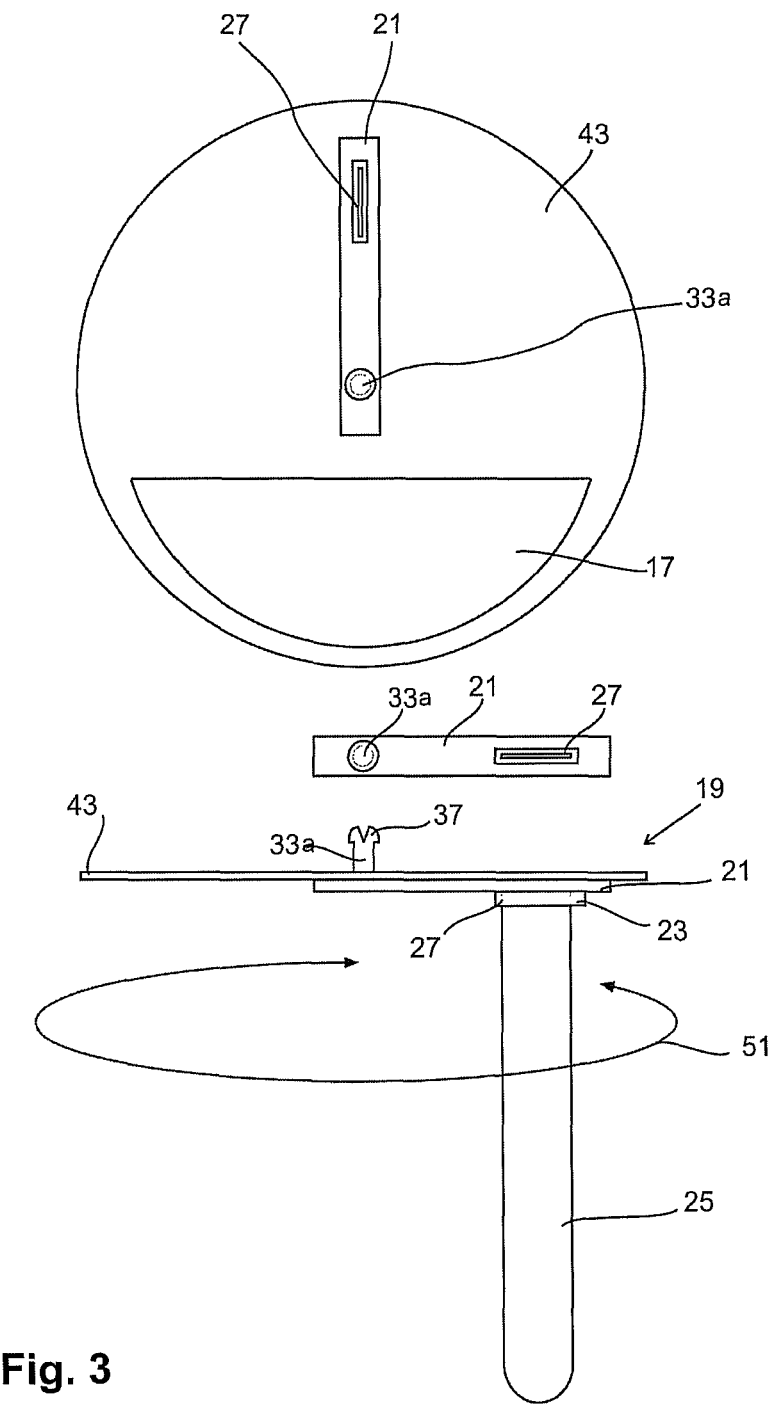
FIG. 3 shows lid bottom parts from different perspectives, such as the stirrer, for example.

In FIG. 3, the lower area of the lid is represented from different perspectives, wherein it is to be emphasized that the additional shim disk 43, which has approximately the same dimensions as the rotary disk 31 (see FIG. 2), is purely optional and it can be omitted in a further embodiment. The rotor 19 is comprised of a slat 21, an integrally molded rotor rivet 33a, an insertion knuckle 27 and a stirrer 25. The insertion knuckle 27 is designed in such a manner that the stirrer 25 can be inserted subsequently in a positive fit into the plug connection 23, which is provided for this purpose. The rotor rivet 33a provides for barbed rivet hooks 37; in a further exemplary embodiment at least for one barbed rivet hook. The barbed rivet hook 37 fixedly connects the rotor 19 to the rotary disk 31 (see FIG. 4). Provision can be made in the main lid part and, if applicable, in the shim disk 43 for a filling spout 17. The rotor 19 can carry out a motion in the direction of rotation 51. The direction of rotation 51 is the only available direction of rotation, which is available for the stirrer 25.

Figure 4:
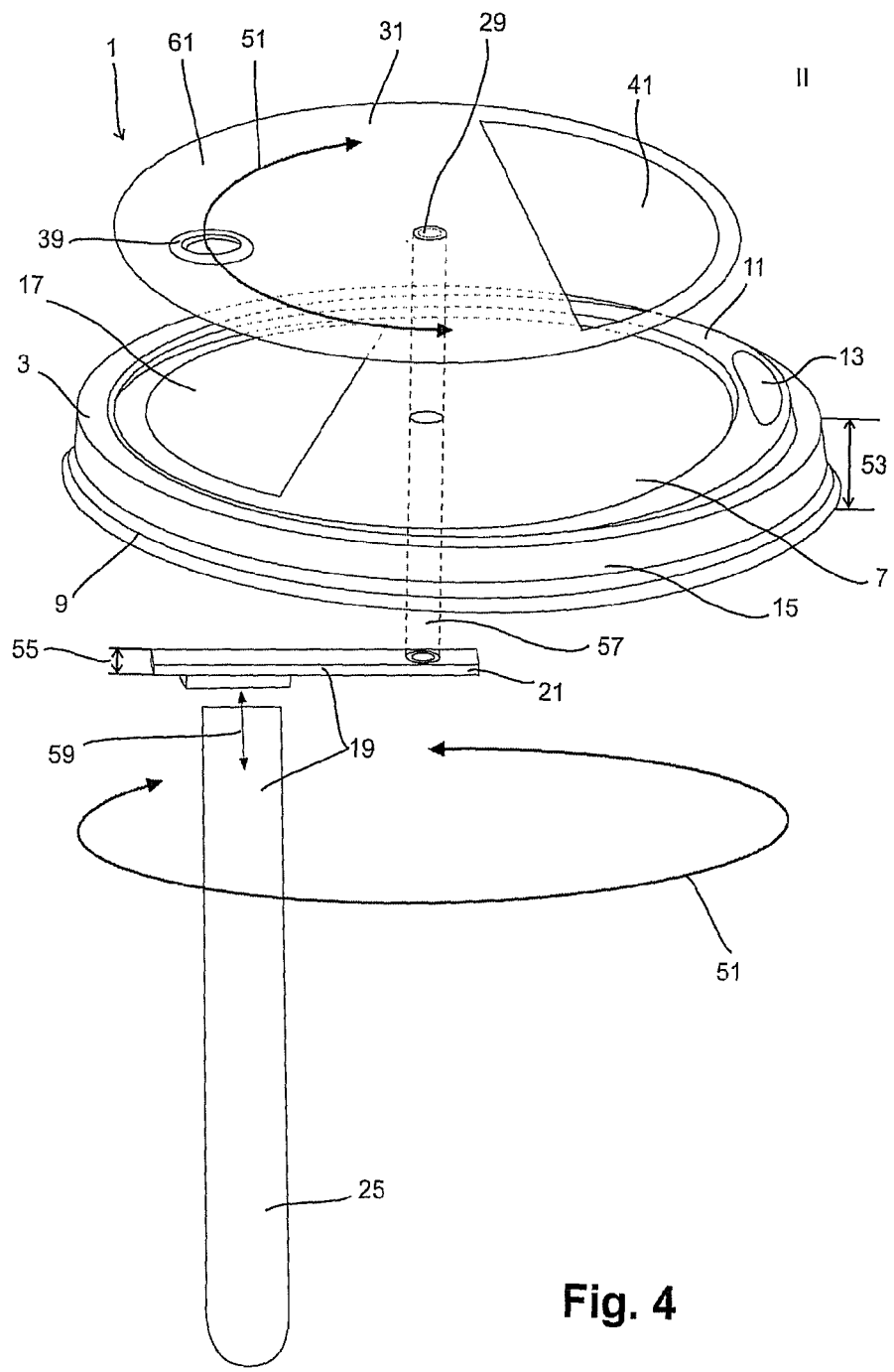
FIG. 4 shows an alternative embodiment of a lid according to the invention.

The connection between rotary disk 31 and rotor 19 is illustrated in FIG. 4 by means of the common axis 57, wherein the rivet design according to FIG. 3 is not explicitly depicted. In addition to the rivet connections, it is also possible to choose any other suitable bearing-forming connections, which are designed in such a manner that the bottom part and the upper part can pass through the main lid part 15. The rotary disk 31 is shown as being almost in the drinking position II, because rotary disk 31 and main lid part 15 are turned relative to one another in such a manner that the filling spouts 17, 41 are not located on top of one another. According to the chosen embodiment of the finger ring 39, said finger ring is optically depicted separately in the rotary disk 31. However, the finger ring does not pass through the rotary disk, so that the drinking liquid can still be retained reliably by means of the rotary disk 31 in response to the chosen finger ring position. By means of a rotatory turning of the rotary disk 31 relative to the main lid part 15, the rotor 19 moves with the stirrer 25 in the same direction. With the help of the two direction of rotation arrows 51 it can be seen that a larger rotary motion of the stirrer 25 within the cup, due to the further eccentric deflection, is possible by means of a small rotary motion of the rotary disk 31. The rotary disk 31 is defined by the rotating flaring 3. The mouthpiece 11, which also defines the rotary disk 31, is additionally integrally molded in the rotating flaring 3 so as to be extracted with reference to its height. A recess 13, which serves as drinking spout, is removed from the mouthpiece 11. The drinking spout 13 is bent in the shape of an oval. The drinking spout 13 is slightly elongate. The clamping edge 9 together with the rotating flaring 3 substantially determines the height of the entire lid 1, except for the stirrer 25, which projects from the lid. The largest portion of the height of the main lid part 15 results from the height 53 of the clamping edge 9. The mouthpiece 11 forms additional height. The height 55 of the slat 21 of the rotor 19 is considerably smaller as compared to the height 53 of the clamping edge 9. It is possible through this to stack a plurality of lids 1 without stirrers 25 on top of one another. The bearing 29 for the rotary disk 31 and the rotor 19 results from the axis 57. A motion, which is to be carried out in axial direction, results in the insertion direction 59 for the stirrer 25 into the slat 21, so as to form the rotor 19. The rotary disk 31 runs on the inner lid depression 7. The finger ring 39 is located at the edge, in the outer area 61 of the rotary disk 31.

Figure 5:
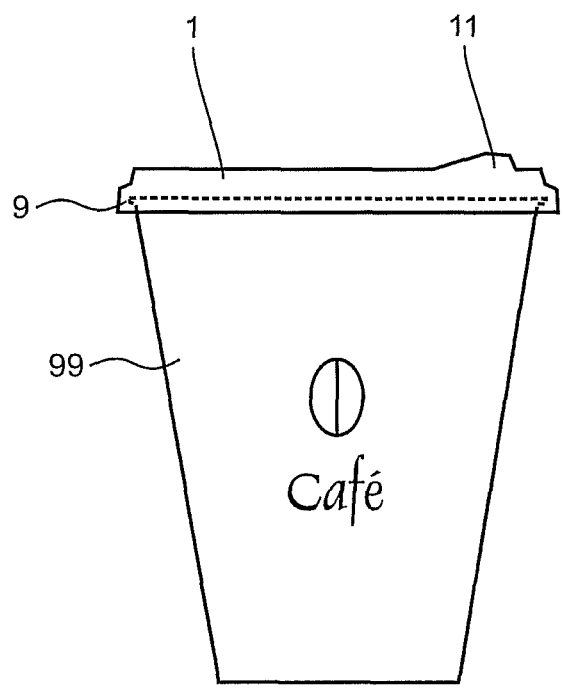
FIG. 5 shows the lid of FIG. 4 together with a warm beverage cup.

FIG. 5 illustrates the cup as a warm beverage container 99 together with the lid 1, wherein it can be seen how the clamping edge 9 sits on the warm beverage container 99.

According to an embodiment, the permanent connection of the rotary disk and of the rotor comprising the main lid part, which is located therebetween and which forms the bearing, is established by means of a rivet connection. According to a further embodiment, the plastic parts can be brought into a permanent connection with one another by means of a plastic welding process. The individual parts, indicated in FIG. 4, can just as well be connected along the common axis 57 by means of an adhesion process. The individual stackable lids 1 can be delivered by the factory without stirrer 25. The stirrer 25, which can be separately packaged hygienically, for example, can subsequently be attached by means of an insertion motion in insertion direction 59. Both parts, upper lid part and stirrer 25, which form the lid, can be delivered in a space-saving manner. By turning the rotary disk 31, a filling position I can be assumed, in which sugar or other additives can be filled into the cup. In the event that the stirrer 25 is not to be used further for cooling down the beverage or for stirring the additives, for example, the stirrer can be turned into a position in which it can remain in the cup 99 without interfering. The only larger outlet opening is then the drinking spout 13 of the mouthpiece 11. The drinking liquid can then successfully be prevented from sloshing out or spilling; after the filling of the beverage, lid and warm beverage container must neither be disassembled by the vendor nor by the consumer.

Figure 6:
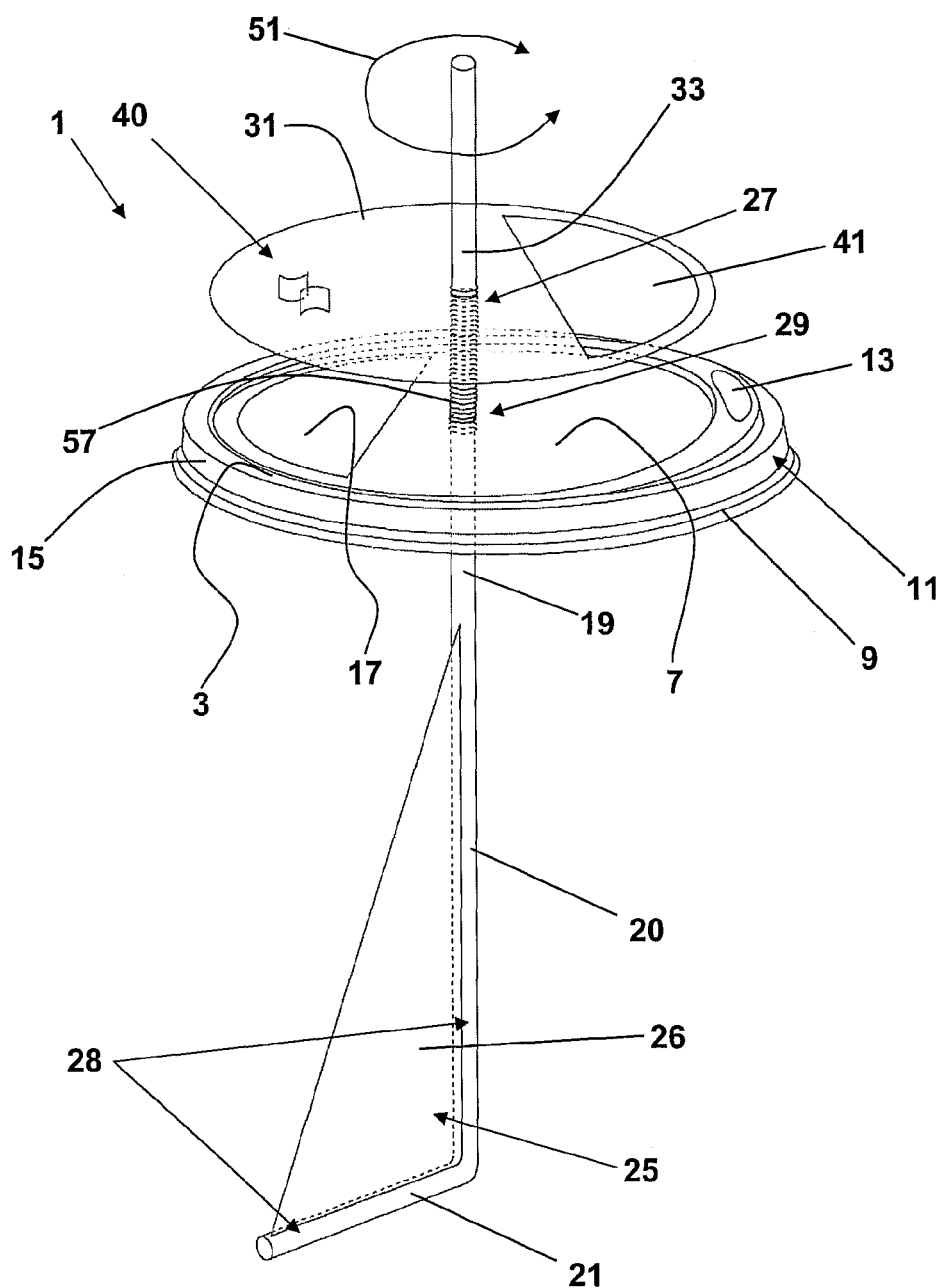
FIG. 6 shows a further, second embodiment of the lid in a first intermediate state on its way into the permanent connection.
Figure 7:
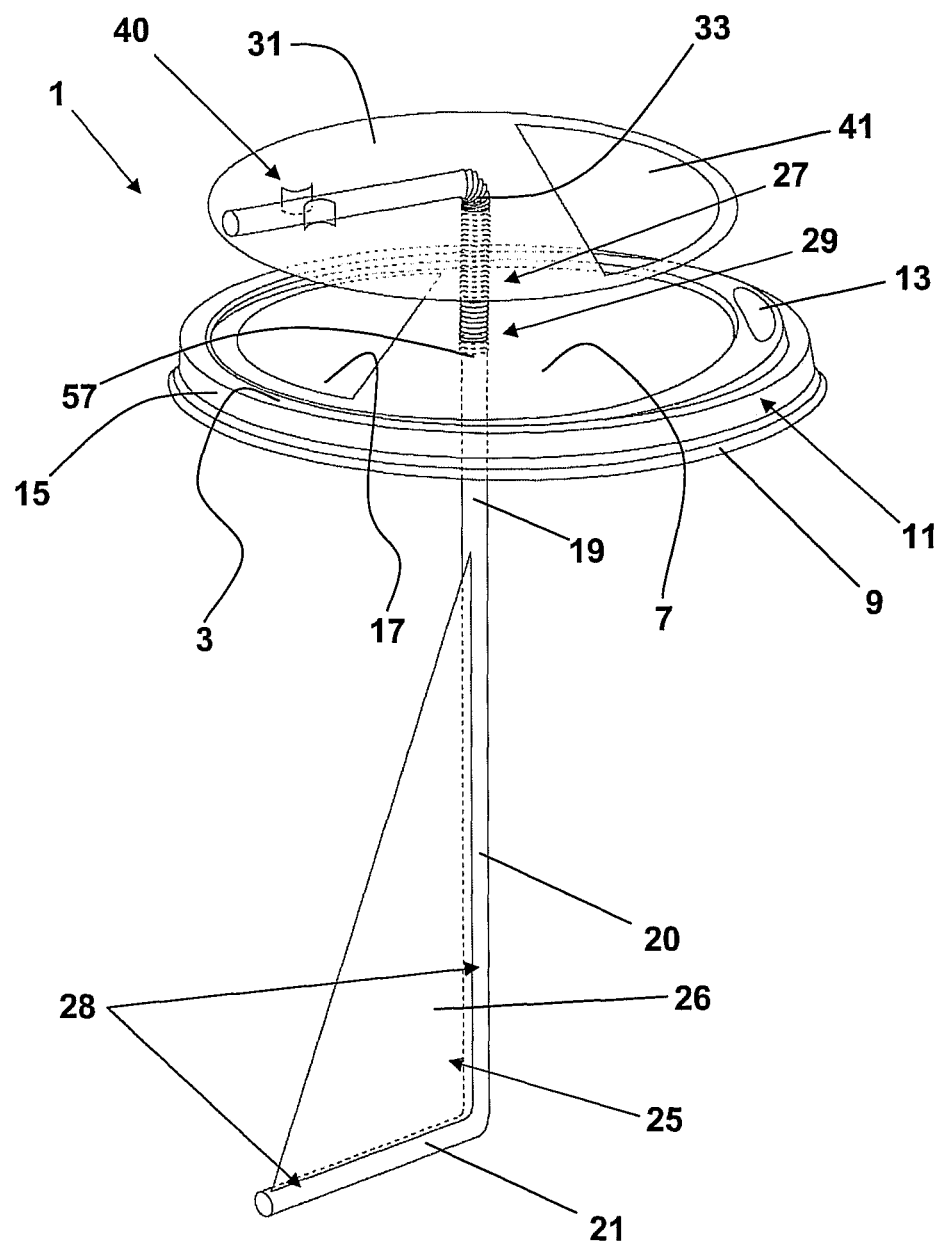
FIG. 7 shows the embodiment from FIG. 6 in the end state of the permanent connection and FIG. 8 shows a further embodiment of the stirring element of FIGS. 6 and 7.

FIGS. 6 and 7 show a further, second, embodiment of the lid 1 according to the invention, which can be designed in a particularly simple manner and which can be produced cost-effectively. As mentioned, the lid 1 comprises the function of making it possible to stir the content of the cup of a beverage cup, which is not illustrated in FIGS. 6 and 7, by means of a stirrer 25. In the second embodiment according to FIGS. 6 and 7, the lid 1 is designed for the single use as beverage cup. The content of the cup can in particular be a warm or hot comestible liquid, such as coffee or tea, for example. The content of the cup can also be a biocompatible base solution, for example, for medically and pharmaceutically active substances, respectively, which can be dissolved therein.

The stirrer 25 encompasses a stirring element 26. The stirring element 26 is at least partially embodied in a two-dimensional manner. As is the case in the other embodiment, the lid 1 comprises a main lid part 15, a rotary disk 31 and a rotor 19. Preferably, the rotor 19 is designed as a small tube-shaped, piston-shaped rotary part, which can be brought into different bending states at least in the area of the bearing location 29. Advantageously, the design of a common bendable straw, for example, can be used as the design for the part of the rotor 19 located above the stirring element 26. However, the part of the piston element 20, which is located in the area of the stirring element 26 and which carries the rotor 19 forward into the stirrer 25, is designed so as to be voluminous, preferably angled, as compared to a common straw. The drinking straw is stirring element 26 as well as drinking element, in particular in a lid position, in which the filling spout 41 is not continuously open.

The angled slat 21 could also be omitted, which would lead to a one-dimensional mounting frame 28. The stiffness of the stirring element 26 is of particular importance for the purpose of attaining a predeterminable stirring effect in the case of a one-dimensional piston-like mounting frame, such as a straw.

The angling of the mounting frame could also be replaced by a curve, for example by an oval or waved curve, of the piston element 20. In the case of a waved curve, more than one at least partially two-dimensional stirring element 26 could also be available, wherein a waved stirring element 26 then fills a curve bulge or a wave crest, respectively, or a wave trough, respectively, of the piston element 20 in a two-dimensional manner. The piston element 20 can be a part of a drinking straw.

The bending or curve, respectively, of the piston element 20 as a continuation of the rotor 19 into the stirrer 25 serves the purpose of attaining a mounting frame for the stirring element 26, which at least partially comprises the stirring element 26. The stirring element 26 is designed herein in a holohedral single-layer manner so as to be impermeable for the content of the beverage container. The stirring element 26, however, could encompass further swirl-inducing, in particular swirl-amplifying design elements, such as round, oval, strip-shaped, etc. flow passage spouts in addition to its area edges, in particular outer area edges.

In the assembled state, the rotary disk 31 and the stirrer 25 are designed so as to be integrally formed in the second embodiment as well. The main lid part 15 is in parallel alignment, between the rotary disk 31 and the stirrer 25. For a clear illustration in FIGS. 6 and 7, the rotary disk 31 is shown so as to be removed upwardly from the main lid part. The main lid part 15 provides for a bearing 29 for a connection 33a, 57 of the rotor 19, which can be inserted, wherein the bearing 29 serves as a rotation point for the stirrer 25, which circles around it, with which one end 33 of the rotor 19 engages. The stirrer 25 forms an insertable, elongate round connector 27, which points axially away from the main lid part 15 and which forms a part of the rotor 19. In the case of the second embodiment, the rotary disk 31 also spans the inner lid depression 7, which is defined by a rotating flaring 3, from which a mouthpiece 11 comprising a drinking spout 13 bulges outwardly.

The rotary disk 31 is equipped with a fixing means 40 for fixing the rotor 19, the upper end 33 of which is bent off when in the permanent connection. Due to their axial protrusion, the fixing means 40 and the upper end 33 of the rotor 19 fulfill the function of the finger ring 39 of the above-described embodiment of FIGS. 1 to 4.

In the pivot state of the permanent connection of the rotor 19, the fixing means 40 and the upper end 33 of the rotor 19 allow for the uncomplicated rotatory actuation of the stirrer 25 by means of the consumer. The fixing means 40 is arranged at the upper side of the rotary disk 31. The fixing means 40 is designed herein as two fixing lugs, which project upwardly. The fixing means 40 could also be designed as a fixing ring, as a fixing strap, etc. As can be seen in FIGS. 6 and 7, the fixing means 40 is arranged in the outer area 61 of the rotary disk 31.

In the second embodiment, the main lid part 15 and the rotary disk 31 in each case also encompass a filling spout 17, 41, which can be aligned by turning the rotary disk 31, so that a switch-over can be made between a filling position I and a drinking position II, preferably by turning the rotary disk 31 by 180°.

The rotor 19 comprises a slat 21. The slat 21 can encompass a smaller height than the height of the clamping edge 9 of the lid 1, which connects to the rotating flaring 3. However, this design is not absolutely necessary in the second embodiment for stacking or nesting, respectively, a plurality of lids 1 into one another, because the rotor 19 comprising the stirrer 25 and its stirring element 26 is designed as a part, which can be stored separately and which can be inserted through the lid 1, that is, through the main lid part 15 and the rotary disk 31 in the bearing 29, preferably as specified above as a modified bendable straw or drinking straw, respectively.

The main lid part 15 and the rotary disk 31 are two flat plastic parts, which are in parallel alignment. The rotor 19 holds the main lid part 15 and the rotary disk 31 in a permanent connection (FIG. 6), which comprises a degree of freedom 51. The permanent connection solely ensures a rotatory direction of motion.

Figure 8:
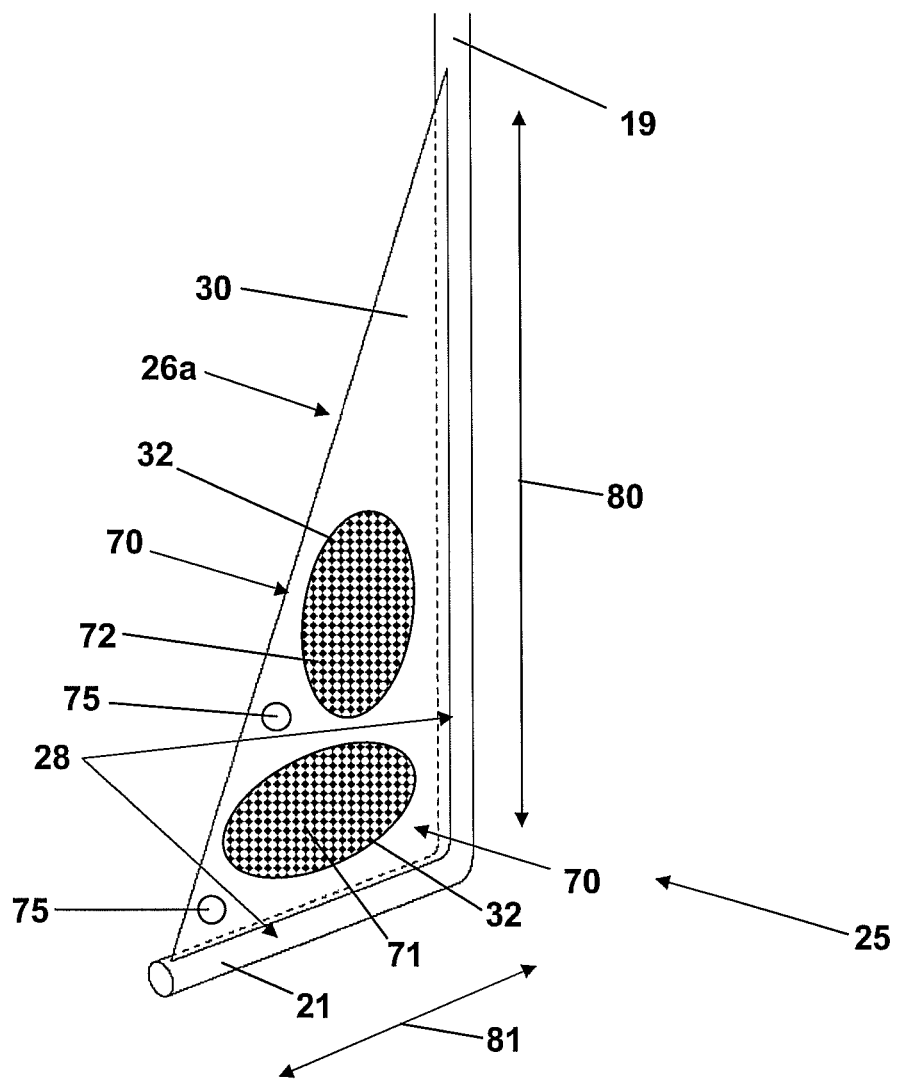

FIG. 8 shows a preferred development of the stirring element in the lower part of the rotor 19. The stirrer 25 encompasses a partially two-dimensional, sail-shaped stirring element 26a. The stirring element 26a is mounted to a mounting frame 28, which at least partially envelopes the stirring element 26a. The mounting frame 28 provides for the mounting of the stirring element 26a in two different directions of extension 80, 81. The stiffness of the stirring element 26a supports the achievement of a stirring effect, which can be predetermined.

The stirring element 26a encompasses a plurality of layers 30, 32 and is thus designed in a plurality of layers. The layers 30, 32 are connected to one another, for example by means of adhesion, at least partially in a two-dimensional manner, in particular at their edges. Preferably, the adhesive is an adhesive, which is suitable for food.

In this embodiment, the mounting frame 28 is formed by a piston element 20, such as a small tube, for example a straw section, which in particular forms the lower part of the rotor 19 of the stirrer 25. The mounting frame 28 is a simple, angled, plane, lower part of the rotor 19. The clamping frame 28 could also encompass a plurality of bendings, for example like a zigzag design.

The stirring element 26a is designed as a container 70 being at least partially suitable for food and being capable of being penetrated by the content of the cup, for at least one additive, which is quantitatively preassembled therein.

The stirring element 26a is designed in a plurality of layers by means of one layer 30 as base or support layer and two further layers 32. The container 70 is designed with at least one compartment 71 for the, in particular, intermediate storage of at least one, preferably quantitatively preassembled additive by means of the layers 30, 32 of the stirring element 26a, which are tightly connected at their edges for the additive.

In the exemplary embodiment of FIG. 8, the stirring element 26a encompasses at least two compartments 71, 72, which are separated from one another, in each case for at least one additive. The compartment 71, 72 provides for the release of the additive stored therein into the content of the cup. The release can take place in time output rates, which can be predetermined. The release can take place in a time-controlled and quantitatively controlled manner. The release can take place in a time-delayed manner, for example. The release can take place at a different release speed. The release can be controlled by means of a rate regulating device. The rate regulating device can be realized by means of different membrane thicknesses or by means of different mesh sizes of the layers 30, 32.

The stirring element 26a encompasses at least one swirl-inducing, in particular swirl-amplifying design element 75. Here, the design element 75 is a flow passage. In response to the activation of the rate regulating device, the design element 75 can be shifted into the appropriate state, that is, into the swirl-supporting or swirl-amplifying state, respectively. The container 70 can also encompass at least one swirl-inducing, in particular swirl-amplifying design element 75. In particular, the swirl-amplifying design element 75 of the container 70 can be shifted into the appropriate state, that is, into the swirl-supporting or swirl-amplifying state, respectively, in response to the activation of the rate regulating device.

The individual components of the disposable product can also be made from biodegradable materials. The individual parts can be made from edible or easily perishable materials, e.g. In the alternatively, biodegradable plastics can be used. The long term shelf life of the used material is less important. The lid is intended for a single use. The lid is characterized by the material-saving and simple design. The dimensionally stable lid can be comprised of materials having different thicknesses. The lid as a whole can be a composite connection, that is, a part of the lid is made of a first plastic, while the rotary disk, for example, is made of a different, thinner or lighter plastic.

List of Reference Numerals:

| | |
|---|---|
| 1 | lid |
| 3 | rotating flaring |
| 5 | transverse lid surface |
| 7 | inner lid depression |
| 9 | clamping edge |
| 11 | mouthpiece |
| 13 | drinking spout |
| 15 | main lid part |
| 17 | filling spout, in particular in the main lid part |
| 19 | rotor |
| 20 | piston element |
| 21 | slat |
| 23 | plug connection |
| 25 | stirrer |
| 26 | at least partially two-dimensional stirring element |
| 26a | sail-shaped stirring Element |
| 27 | insertion knuckle |
| 28 | mounting frame |
| 29 | bearing |
| 30 | layer |
| 31 | rotary disk |
| 32 | layer |
| 33 | end |
| 33a | rotor rivet |
| 35 | rotor rivet hole |
| 37 | barbed rivet hook |
| 39 | finger ring |
| 40 | fixing means |
| 41 | filling spout, in particular in the rotary disk |
| 43 | shim disk (optional) |
| 51 | direction of rotation |
| 53 | height of the clamping edge |
| 55 | height of the slat |
| 57 | axis |
| 59 | direction of insertion |
| 61 | outer area of the rotary disk |
| 70 | container |
| 71 | compartment |
| 72 | compartment |
| 75 | swirl-inducing design element |
| 80 | direction of extension |
| 81 | direction of extension |
| 99 | warm beverage container, in particular single-use cups comprising lid 1 |
| I | filling position |
| II | drinking position |

The invention claimed is:

1. A lid of a beverage cup, comprising:
at least one stirrer, a main lid part, a rotary disk and a rotor, wherein, in the assembled state, the rotary disk and the stirrer are integrally formed, between which the main lid part is in alignment, wherein the main lid part and the rotary disk in each case encompass a filling spout, which can be aligned by turning the rotary disk so that a switchover can be made between a filling position and a drinking position by turning the rotary disk by 180°.

2. The lid according to claim 1, wherein the main lid part provides for a bearing of an insertable connection of the rotor, whereby the bearing serves as a rotation point for the stirrer, which circles around said rotation point, which engages with one end of the rotor.

3. The lid according to claim 1, wherein at least one stirrer is an insertable, elongate round connector, which points axially away from the main lid part and which forms a part of the rotor.

4. The lid according to claim 1, wherein the rotary disk spans an inner lid depression, which is defined by a circumferential flaring, from which a mouthpiece comprising a drinking spout bulges outwardly.

5. The lid according to claim 4, wherein the rotor comprises a slat, which encompasses a smaller height than a height of a clamping edge, which connects to the circumferential flaring.

6. The lid according to claim 1, wherein the rotary disk is equipped with a finger ring, which passes through the rotary disk.

7. The lid according to claim 1, wherein the main lid part and the rotary disk are two flat plastic parts, which are in parallel alignment and which are held in a permanent connection like a joint comprising a degree of freedom by means of the rotor comprising at least one rotor rivet.

8. The lid according to claim 1, wherein the stirrer encompasses a stirring element, which is in an area a two-dimensional stirring element and which is mounted to a mounting frame, which envelopes a part of the stirring element and which provides for the mounting of the stirring element in one direction of extension.

9. The lid according to claim 8, wherein the mounting frame is formed by a cylindrical element, such as a small tube.

10. The lid according to claim 8, wherein the mounting frame is a part of the rotor.

11. The lid according to claim 8, wherein the stirring element is designed as a container being suitable for food and being capable of being penetrated by a content of the cup.

12. The lid according to claim 11, wherein the stirring element encompasses two compartments, in each case for one additive and which provide for the release of the additives into the content of the cup in predetermined time output rates by means of a rate regulating device.

13. The lid according to claim 8, wherein the stirring element encompasses one swirl-inducing design element.

14. The lid according to claim 1, further comprising an axial projection on an upper end of the rotary disk, wherein the axial projection further fulfills a function of a finger ring in cooperation with an upper end of the rotor.

15. The lid according to claim 1, further comprising two fixing lugs for fixing a portion of the at least one stirrer, which project upwardly from the rotor and which are curved.

16. A lid of a beverage cup, comprising:
at least one stirrer, a main lid part, a rotary disk and a rotor, which further comprises the stirrer,
wherein, in the assembled state, the rotary disk and the stirrer are integrally formed, between which the main lid part is in alignment, whereas the stirrer encompasses a two-dimensional stirring element, which is connected to the rotor formed by a drinking straw wherein the main lid part and the rotary disk in each case encompass a filling spout, which can be aligned by turning the rotary disk so that a switch-over can be made between a filling position and a drinking position by turning the rotary disk by 180°.

17. A lid of a beverage cup, comprising:

at least one stirrer, a main lid part, a rotary disk and a rotor, wherein, in the assembled state, the rotary disk and the stirrer are integrally formed, between which the main lid part is in alignment and whereby a lower part of the rotor is formed as a small tube, which can be used for drinking, wherein the main lid part and the rotary disk in each case encompass a filling spout, which can be aligned by turning the rotary disk so that a switch-over can be made between a filling position and a drinking position by turning the rotary disk by 180°.

* * * * *